United States Patent
Wynia

(10) Patent No.: US 7,836,293 B1
(45) Date of Patent: Nov. 16, 2010

(54) ACCELERATED DESERIALIZED BOOT IMPLEMENTATION FOR A MULTIPROCESSOR SYSTEM

(75) Inventor: James P. Wynia, San Jose, CA (US)

(73) Assignee: Force 10 Networks, Inc, San Jose, CA (US)

( * ) Notice: Subject to any disclaimer, the term of this patent is extended or adjusted under 35 U.S.C. 154(b) by 819 days.

(21) Appl. No.: 11/800,681

(22) Filed: May 7, 2007

(51) Int. Cl.
*G06F 9/00* (2006.01)
*G06F 9/24* (2006.01)
*G06F 15/16* (2006.01)

(52) U.S. Cl. .................................. 713/2; 713/1; 709/201
(58) Field of Classification Search ....................... 713/2
See application file for complete search history.

(56) References Cited

U.S. PATENT DOCUMENTS

| | | | | |
|---|---|---|---|---|
| 5,450,576 A | * | 9/1995 | Kennedy | 713/2 |
| 5,867,702 A | * | 2/1999 | Lee | 713/1 |
| 6,058,475 A | * | 5/2000 | McDonald et al. | 713/2 |
| 6,336,185 B1 | * | 1/2002 | Sargenti et al. | 713/2 |
| 6,584,560 B1 | * | 6/2003 | Kroun et al. | 713/2 |
| 6,842,857 B2 | * | 1/2005 | Lee et al. | 713/2 |
| 7,007,161 B2 | * | 2/2006 | Bradley | 713/2 |
| 7,010,678 B2 | * | 3/2006 | O'Shea et al. | 713/1 |
| 2006/0288202 A1 | * | 12/2006 | Doran et al. | 713/2 |
| 2008/0184038 A1 | * | 7/2008 | Fitton | 713/187 |

* cited by examiner

*Primary Examiner*—Suresh K Suryawanshi
(74) *Attorney, Agent, or Firm*—Robert Schuler

(57) ABSTRACT

An accelerated boot process for a multiprocessor system and system components for use with the process are disclosed. Each processor caches at least one compressed system image in local nonvolatile memory. The processors boot concurrently, each using a local image. After a master processor is booted, the other processors verify with the master that each has booted a correct image version. Various redundancy and fallback features are described, which guarantee that all cards can boot and operate even if the preferred local system image contains a defect.

21 Claims, 14 Drawing Sheets

ACCELERATED DESERIALIZED BOOT IMPLEMENTATION FOR A MULTIPROCESSOR SYSTEM

FIELD OF THE INVENTION

This invention relates generally to multiprocessor systems, and more specifically to boot processes for such systems.

BACKGROUND OF THE INVENTION

High-performance telecommunications devices such as packet routers and switches often employ a modular architecture. FIG. 1 illustrates a high-level block diagram of one such router/switch R1 connected in a packet network environment 100. R1 uses a modular chassis where multiple linecards (LC0 to LCn), two route processing modules RPM0 and RPM1, and a switch fabric SF (normally distributed among multiple switch fabric cards, although one is shown) connect to and communicate through a passive backplane 105. High-speed packet traffic enters and leaves router/switch R1 through external linecard ports that couple the device to other packet network devices in a packet network 110. The packet traffic is processed by ingress sections of the linecards and passed through the switch fabric SF to the egress section of an appropriate line card or cards to forward the traffic on to its destination(s).

The route processing modules RPM0 and RPM1 provide overall control of router/switch R1. When two RPMs are included, one is designated as the master, and the other operates in a slave mode that provides redundancy should the first RPM fail in some manner. The master receives and processes packets that are actually addressed to router/switch R1 as a destination, implements various network/switching/routing protocols, shares routing/configuration data with the line cards, and controls scheduling for the switch fabric SF. A backplane Ethernet BE couples the RPMs to each other and to the line cards to facilitate these functions. Each RPM also contains one or more external ports to allow remote management and configuration of router/switch R1 through a dedicated console or packet network-connected device (not shown).

Each RPM and linecard includes one or more general purpose processors. On an RPM, one such processor is designated as the Control Processor (CP) for the entire router. The same processor, or one or more secondary processors on the RPM, are designated as Route Processors (RPs) for the entire router, and run the aforementioned protocols. On each linecard, at least one linecard processor (LP) is responsible for the configuration and management of the packet processing elements on that line card, and typically receives instruction from both the CP and the RPs.

With such a system, the traditional boot sequence is non-trivial and time-consuming due to the large number of processors (e.g., twenty in some implementations), each operating within a specific partition of the system, and yet all working together to achieve full router functionality. FIG. 2 shows a relative boot timeline 200 for two RPMs RPM0 and RPM1 and two linecards LC0 and LC1. Each RPM has a CP and two Route Processors RP1 and RP2. Each linecard has a linecard processor (LP0 and LP1, respectively, for LC0 and LC1).

When router/switch R1 powers up or resets, all of the FIG. 2 processors reset and reference a local boot image. All processors except the CPs use the local boot image to configure their backplane Ethernet connection, and then sit and send periodic requests over the BE for the location of a system image. The CPs, on the other hand, use the local boot image to configure themselves to access a packed image (PI) from one or more repositories on the RPM (e.g., internal or external removable compact flash) or accessible through the RPM's external port(s) (e.g., a FTP server 120 or TFTP server 130 (FIG. 1) connected to packet network 110). The CP may have multiple possible paths to find the PI, and will try the next path in the sequence if it fails to retrieve the PI from the current path.

The packed image PI contains the system images (SIs) for all of the processors in the router, compressed in a single file. The System Image SI for a particular processor contains all the application code necessary for that processor to perform its normal operational functions. When the CP receives the packet image PI, it checks that the PI is error-free, and then decompresses and unpacks the SIs into a protected segment of its local DRAM system memory that is configured as a RAM-disk. The CP validates that its own unpacked SI is also error-free, and then jumps into execution of its SI.

When the CP begins executing its SI, it configures its backplane Ethernet port and attempts to communicate with the CP on the other RPM card, if the router is so configured. When both CPs reach this point in their execution sequence, they negotiate between themselves to elect a master CP, which is the CP on RPM0 in this example. The CP on RPM1 becomes the slave, and continues to boot the SI in slave mode. The CPs eventually reach a point in their SI boot sequences where they are ready to listen to requests from RPs and LPs. The RPs on each RPM request their system images from their respective CPs. The LPs request their system images from the master CP (on RPM0 in this example). The CPs serves these requests by returning to the requesting LP or RP a RAMdisk pathname to the proper SI. Each processor then requests and receives a copy of its SI from the appropriate CP, with the LPs receiving their images over the backplane Ethernet BE. Finally, the RPs and LPs store their respective SIs in local DRAM system memory and jump into execution of the SIs. Eventually, all SIs on all processors are fully booted, and the system is ready to switch and/or route packet traffic.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 1:
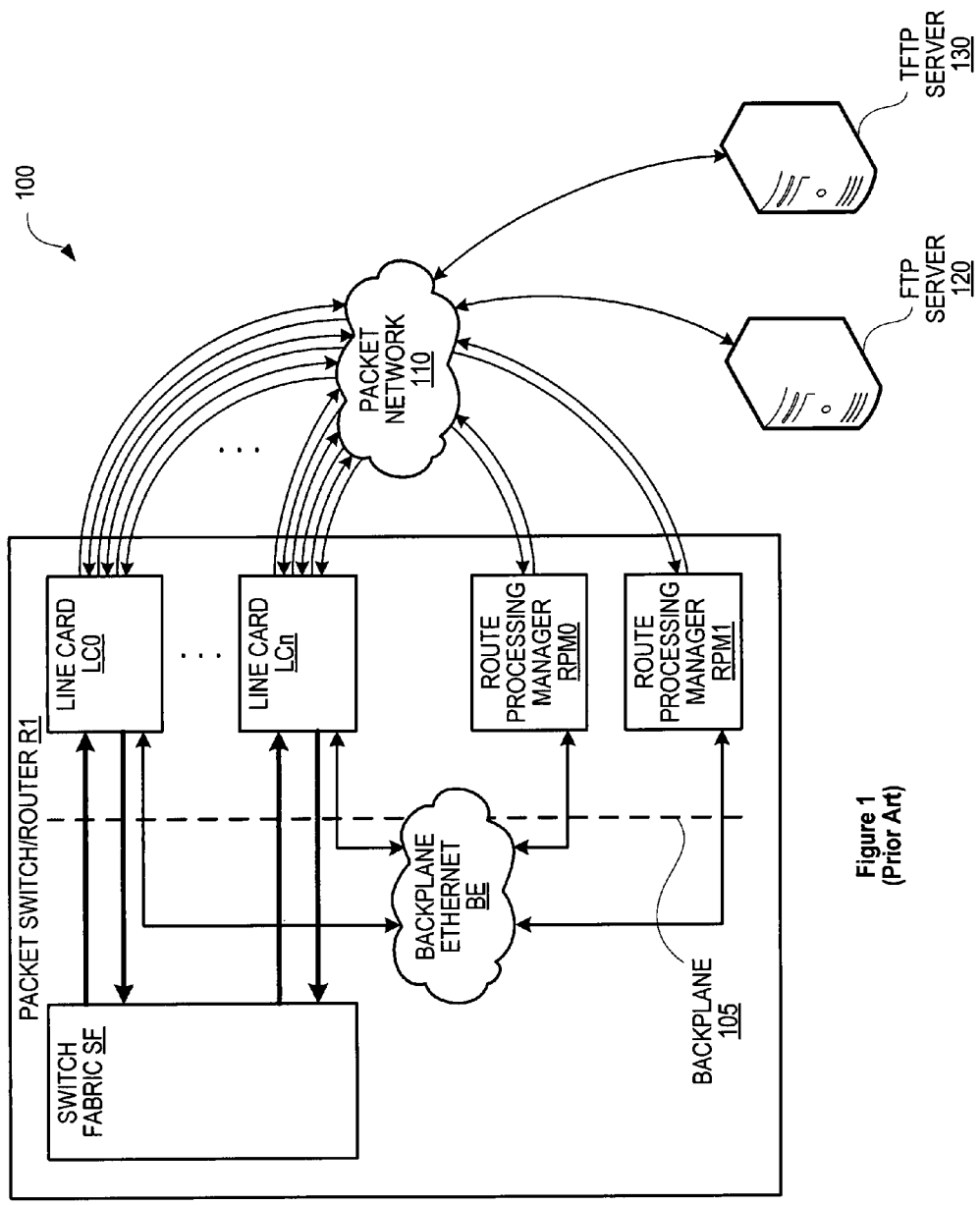
FIG. 1 illustrates a prior art router/switch R1 connected in a packet network environment.
Figure 2:
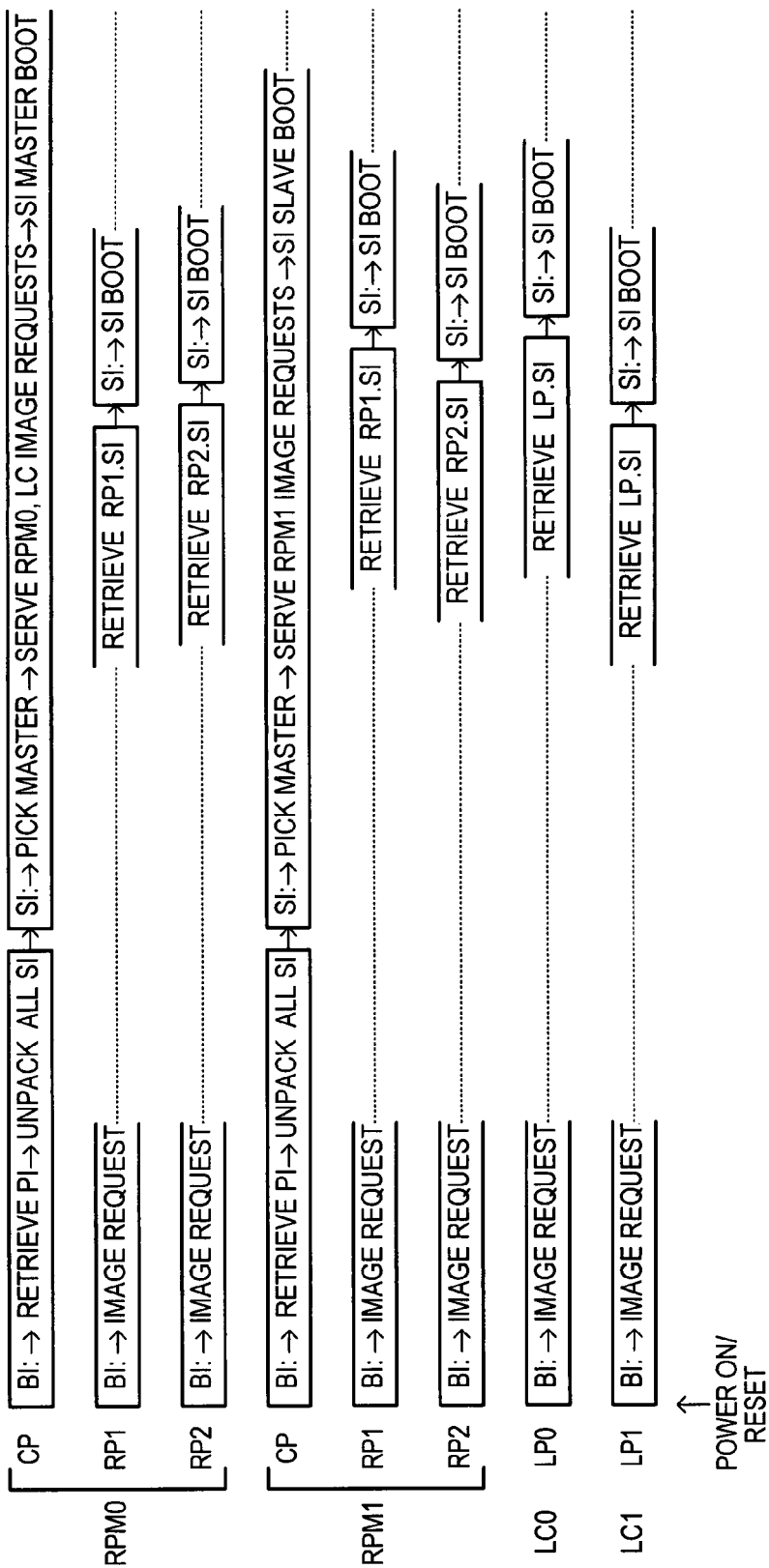
FIG. 2 shows a prior art relative timeline for booting the multiple processors on router/switch R1.

Embodiments disclosed herein can significantly reduce boot time for multiprocessor systems such as the chassis-based system described in conjunction with FIGS. 1 and 2. To reduce boot time in one embodiment, at least the non-control processors store a local system image in nonvolatile memory local to each respective processor. Instead of waiting for the CPs to boot to a state where they have retrieved system images and are ready to serve system images to the other processors, the non-control processors boot into a local system image while the CPs are also booting into their system images. At some later point (but before the system is fully "up"), each processor checks with a master to verify that the local system image that it booted is a correct version, i.e., all processors have booted into compatible image versions. Preferably, sophisticated safeguards are included to provide redundancy, failsafe modes, and on-the-fly update of a local cached system image.

Figure 3:
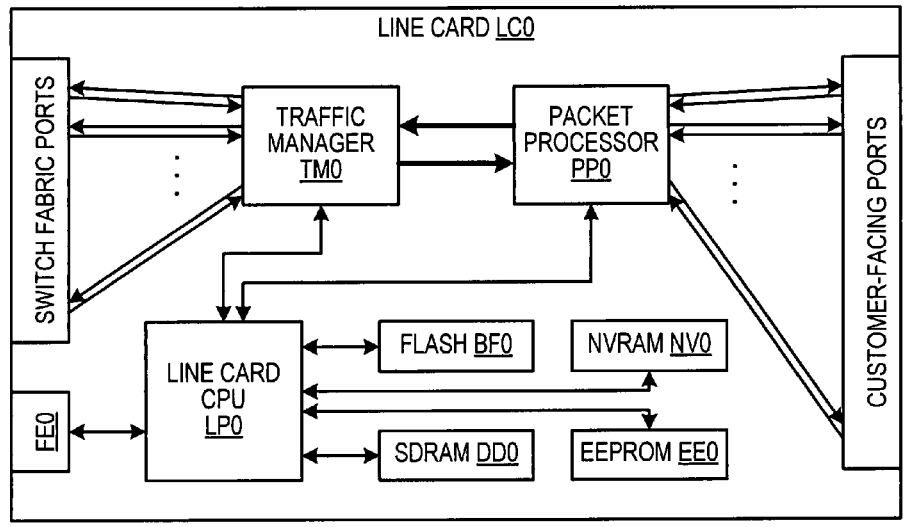
FIG. 3 contains a block diagram for a linecard according to an embodiment.
Figure 4:
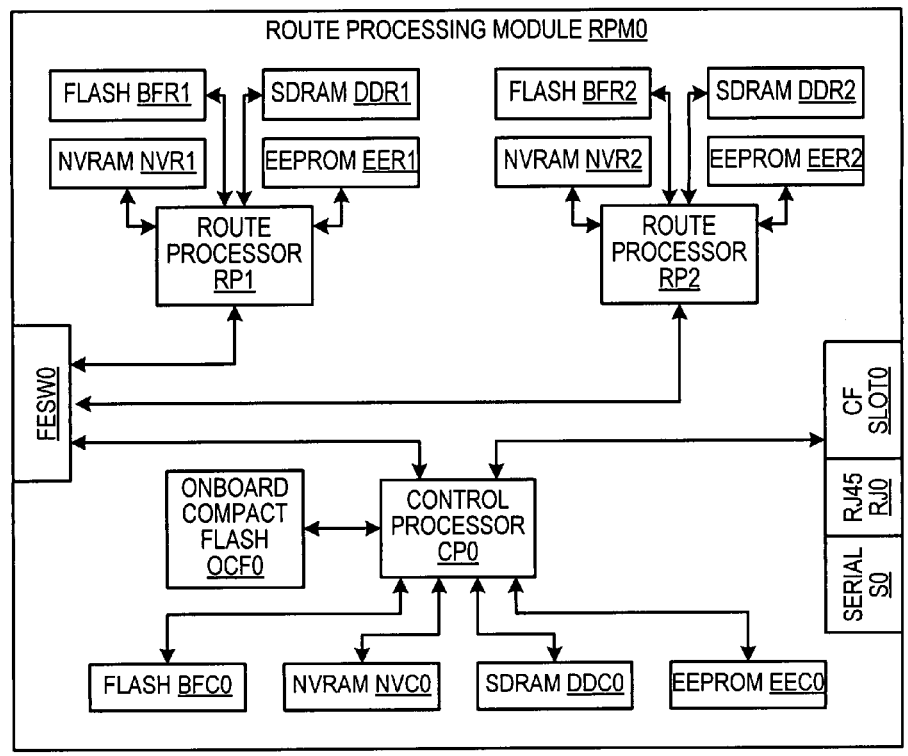
FIG. 4 contains a block diagram for a RPM according to an embodiment.

FIGS. 3 and 4 illustrate, respectively, block diagrams for a line card LC0 and a route processing module RPM0 according to embodiments. Turning first to line card LC0, the line card comprises a line card CPU LP0, at least one traffic manager (one manager, TM0, is shown), and one or more packet processors (one processor, PP0, is shown). The packet processor PP0 is an Application-Specific Integrated Circuit (ASIC) that receives ingress packets from customer-facing ports and transmits egress packets to customer-facing ports. The packet processor PP0 performs ingress processing on the ingress packets, determines an egress line card or cards for the ingress packets, and passes them to the traffic manager TM0. The traffic manager TM0 buffers the packets until they are scheduled to be passed through switch fabric ports for switching to the appropriate egress line cards. A reverse traffic flow (switch fabric ports to traffic manager to packet processor to customer-facing ports) is performed for egress packets received through the switch fabric. Traffic manager TM0 and packet processor PP0 are managed through and configured through the line card CPU LP0. As detailed operation of the traffic manager and packet processor are not central to the present disclosure, further details as to their operation and peripheral components (lookup engines, serializer/deserializers, buffer memories, content-addressable memories, etc.) have been omitted.

As mentioned above, line card CPU LP0 manages and configures the line card components. As such, LP0 runs applications to communicate with the master RPM in the system, providing routing/switching table updates, port configuration, diagnostics and traffic statistics, and any other remote management tools necessary for the line card. Line card CPU communicates with the master RPM through a backplane Fast Ethernet connection FE0, and also communicates with traffic manager TM0 and packet processor PP0 through on-card interfaces. Line card CPU also communicates with four different local memories: boot flash memory BF0, non-volatile random-access memory (NVRAM) NV0, synchronous dynamic random-access memory (SDRAM) DD0, and electronically erasable programmable read-only memory (EEPROM) EE0. One or more of the connections shown to the line card CPU may be direct bus connections, with other connections made through one or more bridge chips (not shown) selected from a chipset compatible with the CPU.

Boot flash memory BF0 stores nonvolatile, persistent (i.e., memory is not lost if power is removed) executable code for a boot selector and two boot images and two compressed system images. Boot flash memory BF0 is only updated under controlled conditions, as will be described later.

NVRAM NV0 stores nonvolatile, non-persistent data such as diagnostic trace data, system logs, and other metrics that may be useful, e.g., should the line card malfunction or reset. LP0 will generally write message logs and data to NVRAM NV0 that can be retrieved by a system administrator.

SDRAM DD0 stores volatile data and executable application code for processor LP0. SDRAM DD0 serves as the traditional system/working memory for processor LP0.

EEPROM EE0 stores nonvolatile, persistent data such as boot flags, image flags, and boot loop counters, as will be described later. Although such data could be stored in boot flash memory BF0, separate memories are employed in this embodiment. Using an EEPROM for the boot flags decreases the chances that they will be inadvertently overwritten, as special write command sequences are necessary to change the EEPROM data. Also, since the boot code does not write to flash memory BF0, this decreases the chances that faulty boot code could damage a good copy of the boot code.

FIG. 4 contains an analogous block diagram for a route processing module RPM0. Module RPM0 contains three general purpose processors—a control processor CP0, a route processor RP1, and a route processor RP2. The three processors communicate with each other, as well as with line card processors and processors on another RPM, through a fast Ethernet switch FESW0. One or more of the connections shown to each RPM processor may be direct bus connections, with other connections made through one or more bridge chips (not shown) selected from a chipset compatible with the CPU.

Each processor couples to its own four local memories similar to those coupled to the line card CPU LP0 of FIG. 3. Route processor RP1 couples to flash memory BFR1, NVRAM NVR1, SDRAM DDR1, and EEPROM EER1. Route processor RP2 couples to flash memory BFR2, NVRAM NVR2, SDRAM DDR2, and EEPROM EER2. Control processor CP0 couples to flash memory BFC0, NVRAM NVC0, SDRAM DDC0, and EEPROM EEC0. Each RPM processor uses its memories similar to the descriptions above for the line card CPU memories. The control processor may also create a RAMdisk partition in its SDRAM DDC0 to store system images for other processors in the system.

Additionally, control processor CP0 couples to onboard compact flash memory OCF0, an external compact flash slot SLOT0, a serial port S0, and an Ethernet RJ45 jack RJ0. The control processor can access the onboard compact flash, external compact flash inserted in CF SLOT0, or a remote server connected through RJ45 jack RJ0 to retrieve packed images when necessary.

Figure 5:
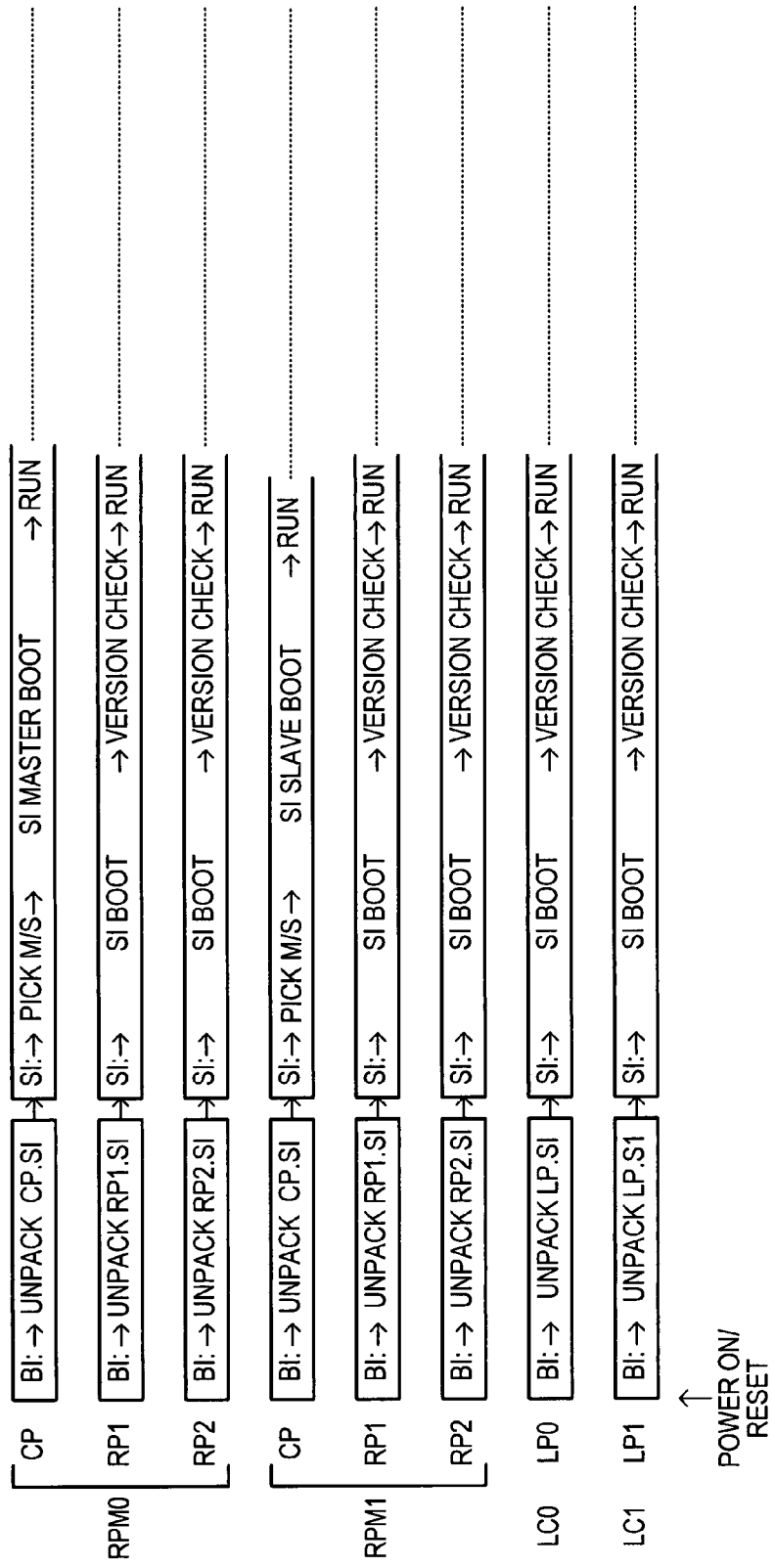
FIG. 5 shows a relative timeline for booting the multiple processors on a router/switch using FIG. 3 linecards and FIG. 4 RPMs, according to an embodiment.

The line card LC0 (and other similarly configured line cards) and route processing module RPM0 can be inserted in a multiprocessor switch/router chassis arranged in the configuration shown in FIG. 1. Line card LC0 and RP module RPM0 can be configured to allow a "cache boot" mode for the chassis, instead of or in addition to the traditional boot sequence shown in FIG. 2. A relative boot timeline 500 for the cache boot mode is illustrated in FIG. 5, for two RPMs RPM0 and RPM1 and two linecards LC0 and LC1. Each RPM is configured as shown in FIG. 4, with a CP and two Route Processors RP1 and RP2. Each linecard is configured as shown in FIG. 3, with a linecard processor (LP0 and LP1, respectively, for LC0 and LC1).

When the router/switch R1 powers up or resets, all of the FIG. 5 processors reset and reference a local boot image. All processors use their local boot image to select a compressed system image stored in their respective local boot flash memory, as will be explained below. Each processor decompresses or unpacks its local system image into its SDRAM system memory, and then boots into its system image.

When the CPs begin executing their SI, they configure their backplane Ethernet ports and attempt to communicate with the CP on the other RPM card, if the router is so configured. When both CPs reach this point in their execution sequence, they negotiate between themselves to elect a master CP, which is the CP on RPM0 in this example. The CP on RPM1 becomes the slave, and continues to boot the SI in slave mode. Meanwhile, the RPs and LPs are booting their respective system images. Eventually the RPs and LPs, assuming they boot successfully, reach the end of their SI boot sequence. Before leaving the SI boot sequence, each RP and LP requests a version check for the system image they have booted. The RPs on each RPM check their version with their respective CPs. The LPs check their version with the master CP (on RPM0 in this example). Assuming all system image versions are synchronized, the system is ready to switch and/or route packet traffic. Because each processor boots autonomously, all processors can boot their system images concurrently. This allows the RPs and LPs to boot much faster than with the central image distribution scheme, which requires the RPs and LPs to wait for the CPs to boot.

Figure 6:
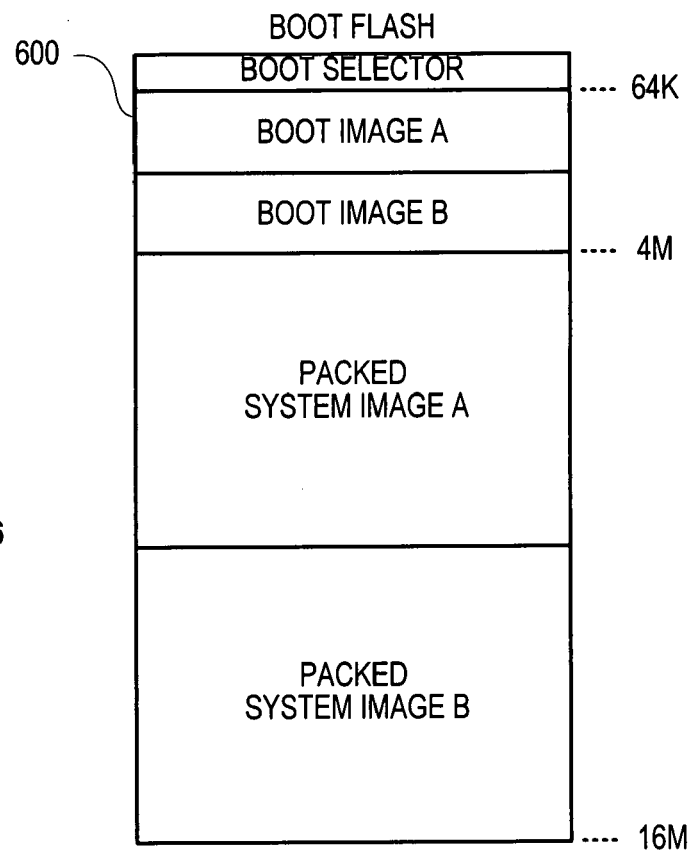
FIG. 6 shows the arrangement of boot components in non-volatile memory local to a processor according to an embodiment.
Figure 6:
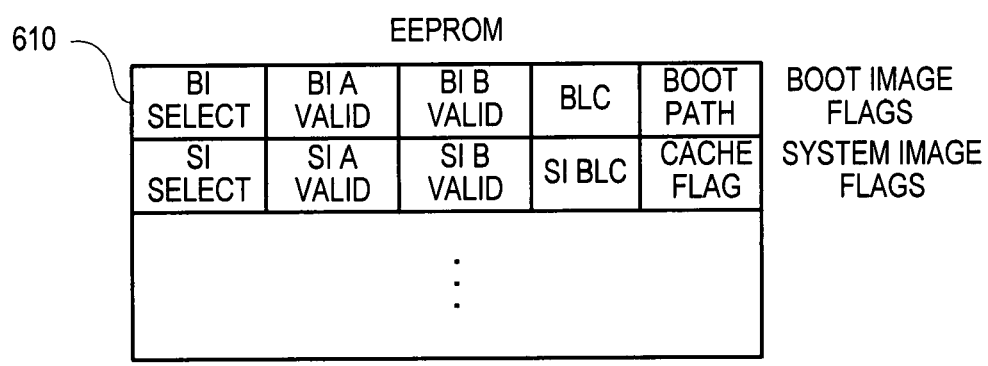

FIG. 6 illustrates the memory arrangement of boot flash memory 600 and EEPROM 610 for each of the processors in one embodiment. Boot flash memory 600 stores an executable boot selector routine in its bottom 64K address block. An executable boot image A and a redundant executable boot image B are stored between addresses 64K and 4M. The upper 12M (between 4M and 16M) of the boot flash store two packed system images, a system image A and a system image B.

EEPROM 610 stores a set of boot image flags and a set of system image flags (other persistent data can also be stored in EEPROM 610 but is not shown). The boot image flags include a boot image selection flag BI SELECT, two boot image valid flags BI A VALID and BI B VALID, a boot loop counter BLC, and a boot path description BOOT PATH. The system image flags include a system image selection flag SI SELECT, two system image valid flags SI A VALID and SI B VALID, a boot loop counter SI BLC, and a cache flag. The use of the flags and counters during the boot process will be described below.

Figure 7:
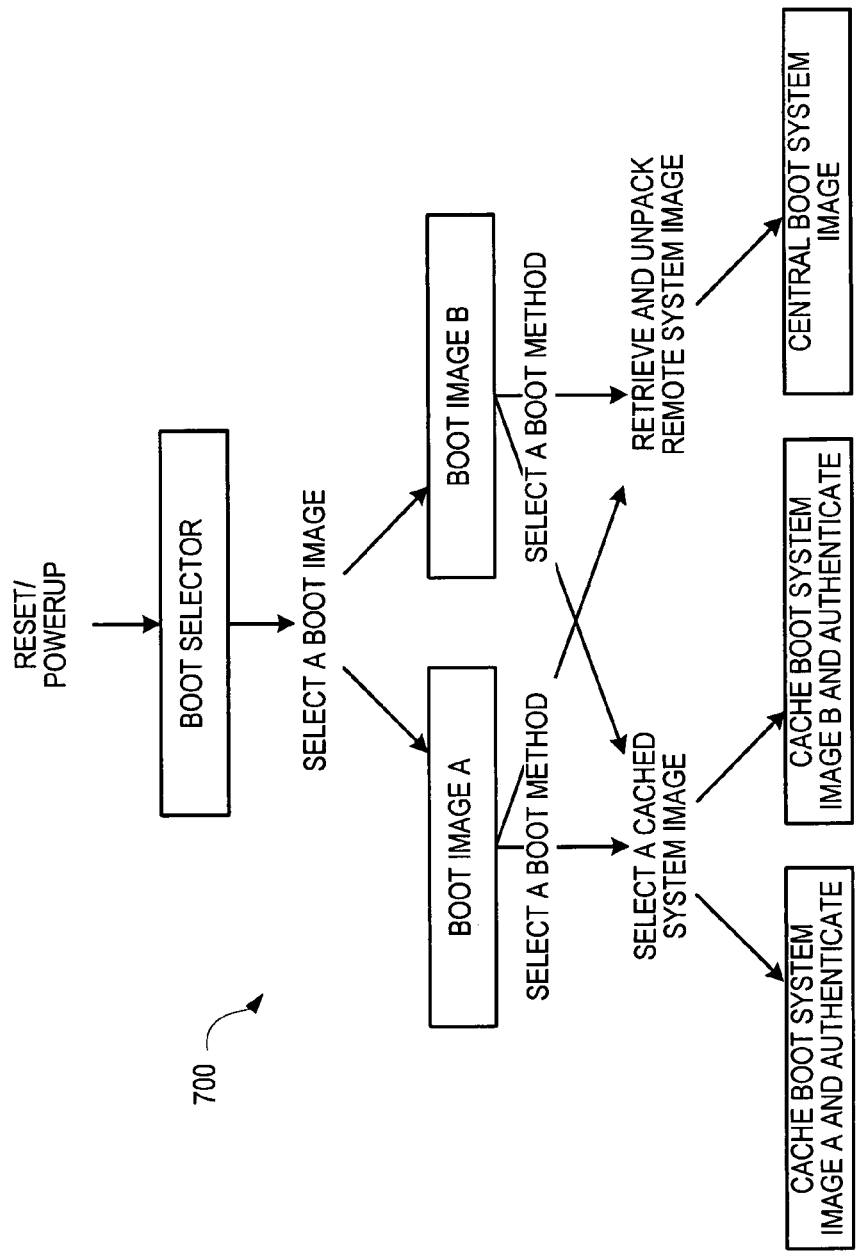
FIG. 7 illustrates the high-level boot process according to an embodiment.

An embodiment using the flash and EEPROM arrangement of FIG. 6 can provide a dynamic boot sequence with redundancy and multiple failsafe fallback options, as shown in the high-level flowchart 700 of FIG. 7. Upon reboot, each processor sets its program counter to zero and begins executing instructions from the boot selector stored in boot flash 600. The boot selector reads the BI SELECT flag from EEPROM 610 to select either boot image A or boot image B. The selected boot image reads the cache flag from EEPROM 610 to determine a boot method (either cached or central boot). When the boot method is central boot, the boot image retrieves and unpacks a remote system image from its master boot processor. When the boot method is cache boot, the boot image reads the SI SELECT flag from EEPROM 610 to select either packed system image A or packed system image B. The boot image decompresses the selected system image to SDRAM memory, and jumps into the system image boot sequence. After successfully booting, the system image authenticates its image version with the master boot processor.

Figure 8:
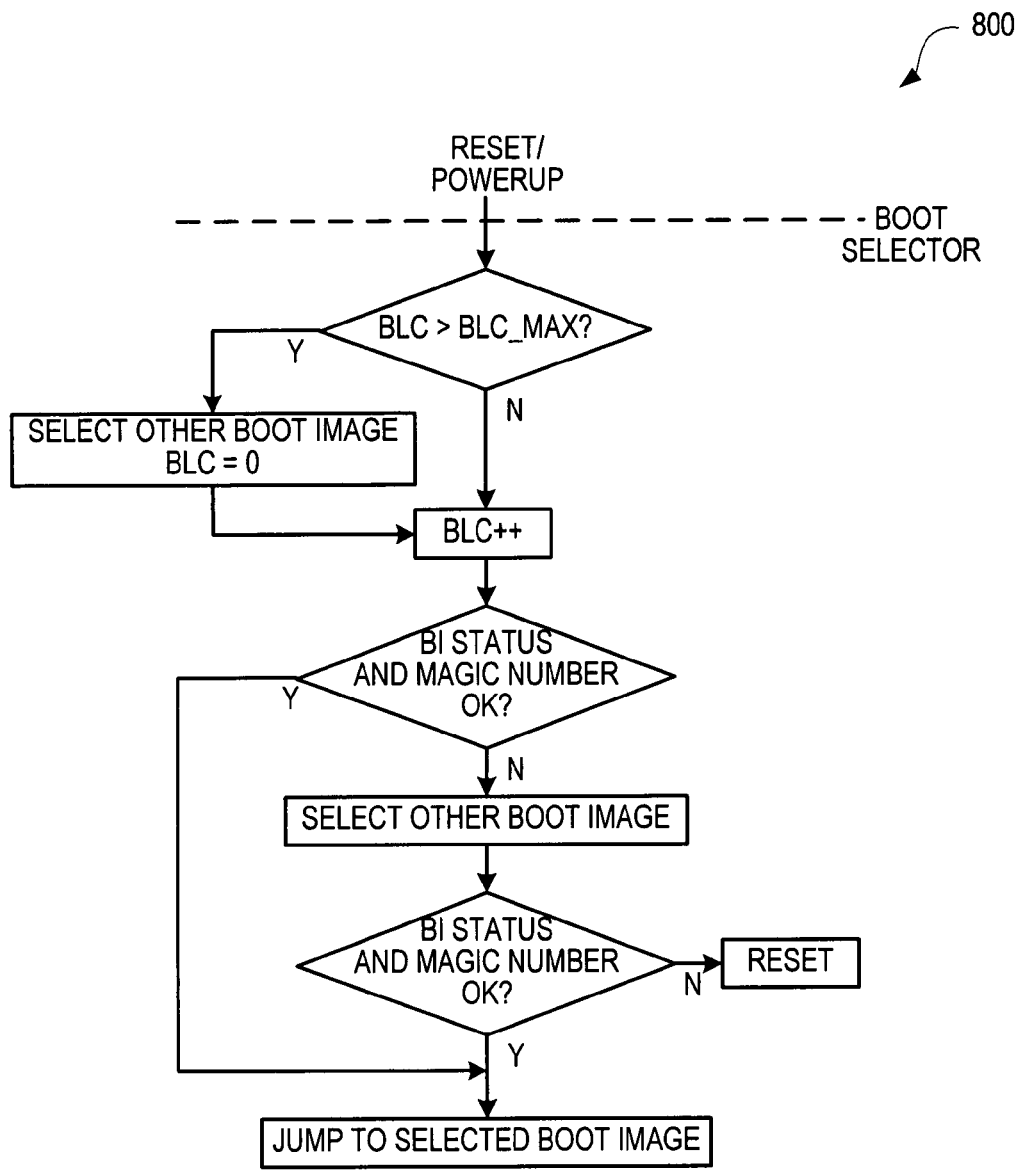
FIG. 8 contains a flowchart for a boot selector used in an embodiment.

FIGS. 8-11 and 13 contain flowcharts detailing the logic within the boot selector, boot images, and system images that is used to provide redundancy and fallback positions for the boot process. Turning first to FIG. 8, flowchart 800 illustrates logic for the boot selector. The boot loop counter BLC tracks the number of times the system has tried to boot using the current boot image (A or B). The boot selector reads BLC and compares it to a maximum number of boot attempts parameter BLC_MAX. When BLC exceeds BLC_MAX, the boot selector selects the other boot image by toggling the BI SELECT flag in EEPROM 610, and resets BLC in EEPROM 610. This allows the boot process to try to recover from repeated boot failures that may be caused by a bad boot image. The boot selector increments BLC and stores it back to EEPROM 610.

After completing the BLC check, the boot selector performs a status check and a magic number check on the selected boot image. The status check reads the appropriate valid flag (BI A VALID or BI B VALID) from EEPROM 610. If the valid flag is not set, the selected boot image has been marked bad and should not be used. If the valid flag is set, the boot selector looks for a specific bit sequence (a "magic number") from the first memory locations allotted to the selected boot image. If the magic number is not found, the selected boot image is assumed to be bad, missing, or stored at the wrong starting address.

When either the status check or the magic number check fails, the boot selector selects the other boot image by toggling the BI SELECT flag in EEPROM 610. The boot selector then checks the valid flag and magic number on the alternate boot image. If either check fails, the processor resets.

Assuming one or the other of the boot images passed the checks, the boot selector completes by jumping to the first code location in the selected boot image and continuing execution.

Figure 9:
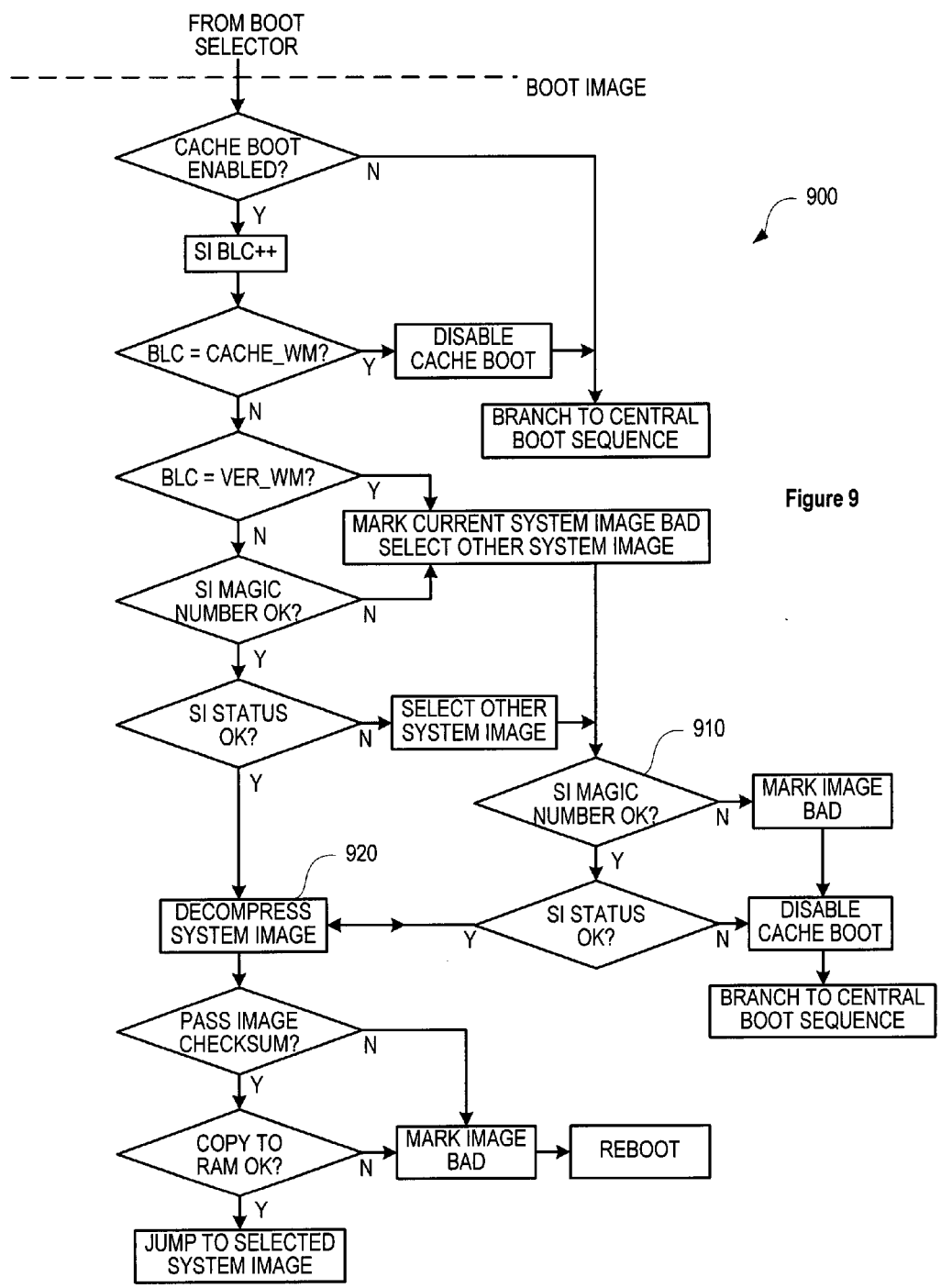
FIG. 9 contains a flowchart for a boot image according to an embodiment.
Figure 13:
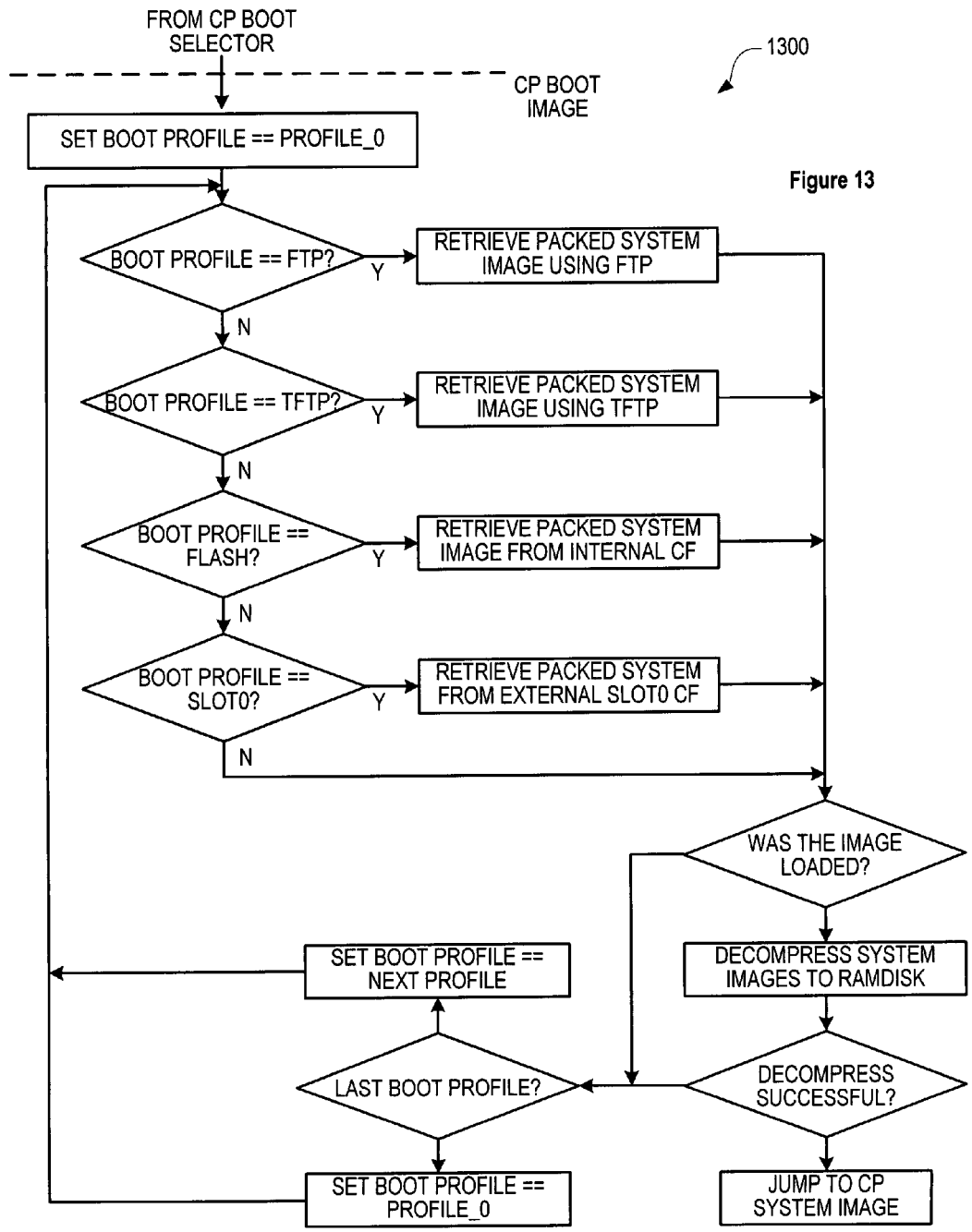
FIG. 13 contains a flowchart for a non-cached central boot image used in an embodiment.

FIG. 9 contains a flowchart 900 for a boot image cache boot sequence. When the boot image is initiated, it accesses the cache flag in EEPROM 610 to determine whether cache boot is enabled. If cache boot is disabled, the boot selector branches to the central boot sequence (FIG. 13). Otherwise, the SI BLC is incremented in EEPROM 610, and then tested against a cache watermark parameter CACHE_WM. When SI BLC exceeds CACHE_WM, this indicates that a cache boot has been attempted the maximum number of tries allowed, without success. In this case, cache boot is disabled by toggling the cache flag in EEPROM 610, and the boot selector branches to the central boot sequence.

When SI BLC has not exceeded CACHE_WM, SI BLC is tested against a version watermark parameter VER_WM. If SI BLC and VER_WM are equal, the selected system image (system image A or B) has been attempted a maximum number of tries allowed, without success. In this case, the current system image is marked as bad by toggling its valid flag in EEPROM 610, and the alternate system image is selected by toggling the SI SELECT flag in EEPROM 610. The boot image then branches to decision block 910 for further testing.

When the BLC passes both checks, the boot image checks a magic number stored in the beginning memory locations of the selected system image. When the magic number is bad, the current system image is marked as bad by toggling its valid flag in EEPROM 610, and the alternate system image is selected by toggling the SI SELECT flag in EEPROM 610. The boot image then branches to decision block 910 for further testing.

When the current system image passes the magic number check, the system image VALID flag corresponding to that system image is checked in EEPROM 610. If the system image has been marked bad, the system switches to the alternate system image, and then branches to decision block 910 for further testing. If the system image has not been marked bad, the boot image branches to block 920.

Decision block 910 checks the magic number for the alternate system image. When the magic number is incorrect, the alternate system image is marked as bad by toggling its valid flag in EEPROM 610, and cache boot mode is disabled by toggling the cache flag in EEPROM 610. The boot image then branches to the central boot sequence (FIG. 13).

When the decision block 910 magic number check passes, the system image VALID flag corresponding to that system image is checked in EEPROM 610. If the system image has been marked bad, cache boot mode is disabled by toggling the cache flag in EEPROM 610. The boot image then branches to the central boot sequence (FIG. 13). When the VALID flag check completes successfully, the boot image branches to block 920.

Block 920 decompresses the system image to SDRAM system memory. During decompression, a checksum is tallied and compared to a checksum stored with the packed image. After the decompressed image is stored to RAM, the image is read back and checked for errors as well. If either of these operations fails, the image is marked as bad by toggling the valid flag in EEPROM 610, and then the processor is rebooted. When all system image checks pass, the boot image terminates by jumping into the selected system image in RAM to continue execution.

Figure 10:
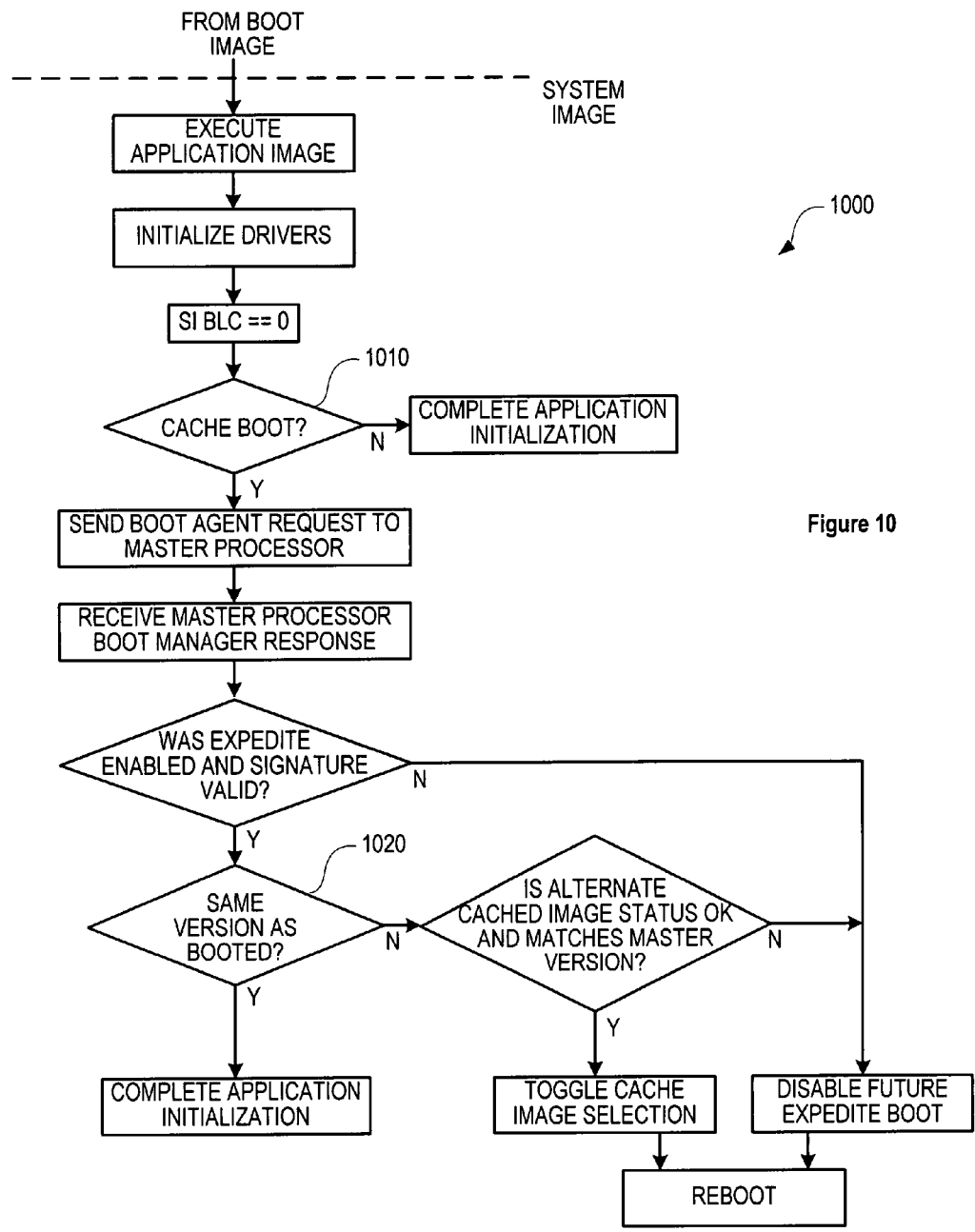
FIG. 10 contains a flowchart for the boot portion of a system image according to an embodiment.

FIG. 10 contains a flowchart 1000 for a boot portion of a system image according to an embodiment. When the boot image transfers execution into the system image, drivers are initialized for the applications run by the processor. Assuming that everything initializes normally, a successful boot is declared and the SI BLC stored in EEPROM 610 is reset. Depending on the boot source, however, further action may be required.

Decision block 1010 retrieves the cache flag from EEPROM 610, and determines whether the processor booted from a local cached system image or from a central system image. When the boot occurred from a central system image, an image version match with the master boot processor is guaranteed as the master boot processor supplied the central system image. In this case, the system image boot sequence completes application initialization and enters a run mode. When the boot occurred from a local cached system image, however, there is the possibility that the cached system image is incompatible with the master processor's system image. In this case, decision block 1010 initiates a boot agent request to the master processor. The boot agent request informs the appropriate master processor (the CP on the same card for a RP, or the master CP for an LP) of the system image that was booted, e.g., by sending a signature stored with the cached image. A boot manager running on the master processor returns a response that informs the requesting processor whether its signature was valid, whether the requesting processor was allowed to perform an expedited boot using a local cached image, and a master boot image version number. When the expedited boot was performed in error, or the booted image's signature was invalid, the system image boot sequence disables future expedited boots by toggling the cache flag in EEPROM 610, and reboots.

When the expedited boot was allowed and the signature was valid, it is still possible that an incorrect system image version was booted. Decision block 1020 verifies the version number. When the correct version was booted, the system image boot sequence completes application initialization and enters a run mode. When an incorrect version number was booted, the alternate cached image is examined by checking its valid flag in EEPROM 610 and its version number in boot flash memory 600. If one or both of these checks fail, the system image boot sequence disables future expedited boots by toggling the cache flag in EEPROM 610, and reboots. If both of these checks pass, the system image boot sequence toggles the cache image selection flag SI SELECT in EEPROM 610, and reboots.

All elements stored in the boot flash memory 600 for one of the processors are updatable. In one embodiment, the operating system prohibits updating the particular boot image and compressed system image that were used to boot the running system. This ensures that at least one boot image and one cached system image are operable (it is assumed that the current boot image and cached system image are operable as they were used to boot the now-running system), in case the updated version is bad or broken. The redundant image can, however, be updated. This allows new features or bug fixes to be tested by changing the redundant image in flash 600 and then changing the boot select flag in EEPROM 610 and rebooting, while preserving a known good image in case the new image fails to boot or run properly.

Figure 11:
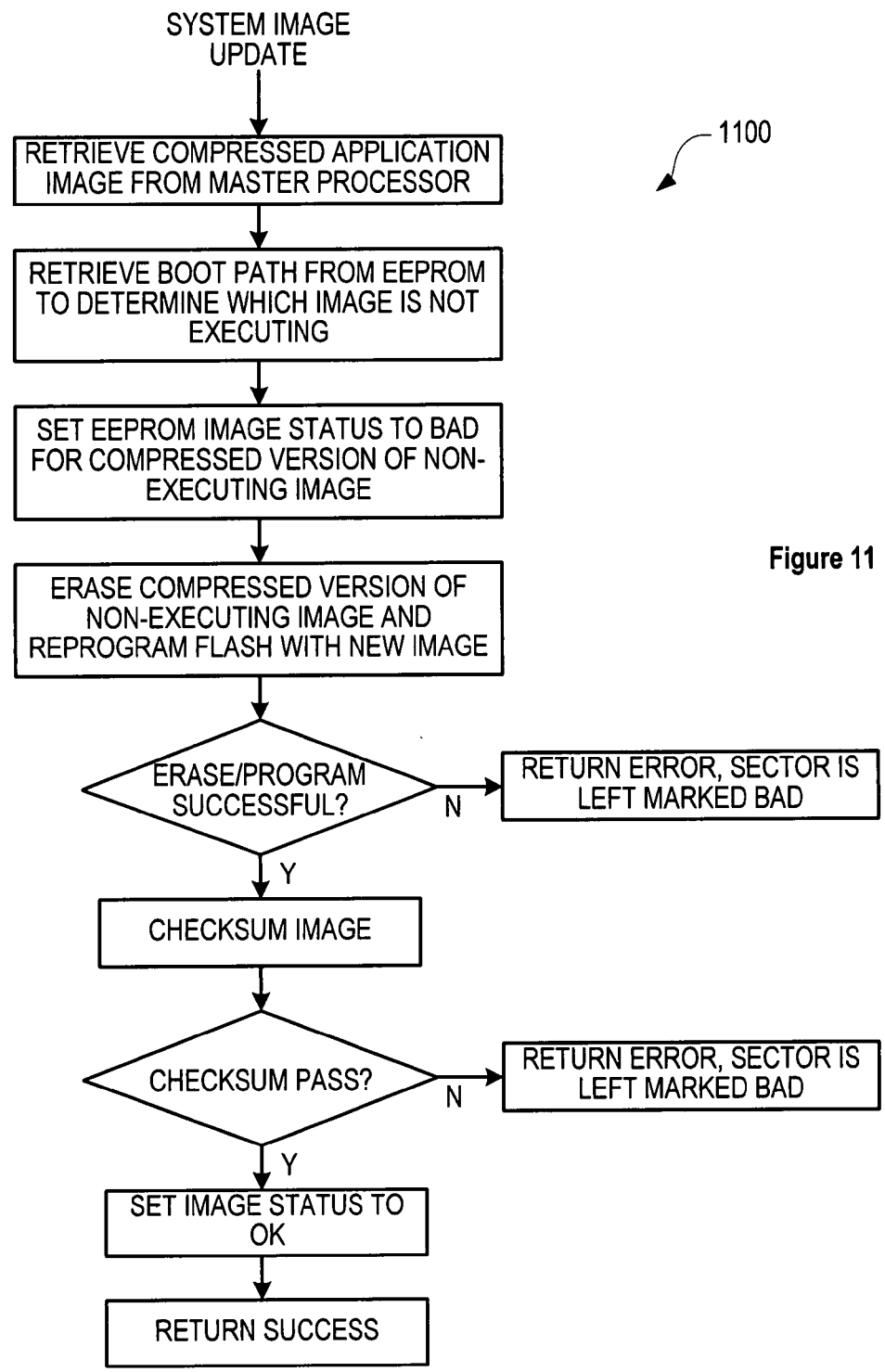
FIG. 11 contains a flowchart for updating a cached system image according to an embodiment.

FIG. 11 contains a flowchart 1100 showing system image logic for updating a local image. Upon receiving a management command to update a local cached system image, the processor retrieves a new compressed application image, e.g., from a specified RAMdisk path on the master processor. The BOOT PATH flags stored in EEPROM 610 are also retrieved, as these indicate the components used to boot the running system. Next, the processor sets the EEPROM SI VALID bit to invalid for the compressed image corresponding to the non-executing system image. The compressed image corresponding to the non-executing system image is then erased from flash 600 and is replaced in flash 600 with the new image.

Next, the erase/program operation is validated. If the operation could not be performed successfully, an error condition is returned, and the image is left marked invalid. Otherwise, the image is read from flash and checksummed against the version retrieved from the master processor. If the checksum operation fails, an error condition is returned, and the image is left marked invalid. If the checksum operation passes, the corresponding SI VALID bit is set to valid in EEPROM 610, and a success condition is returned.

Figure 12:
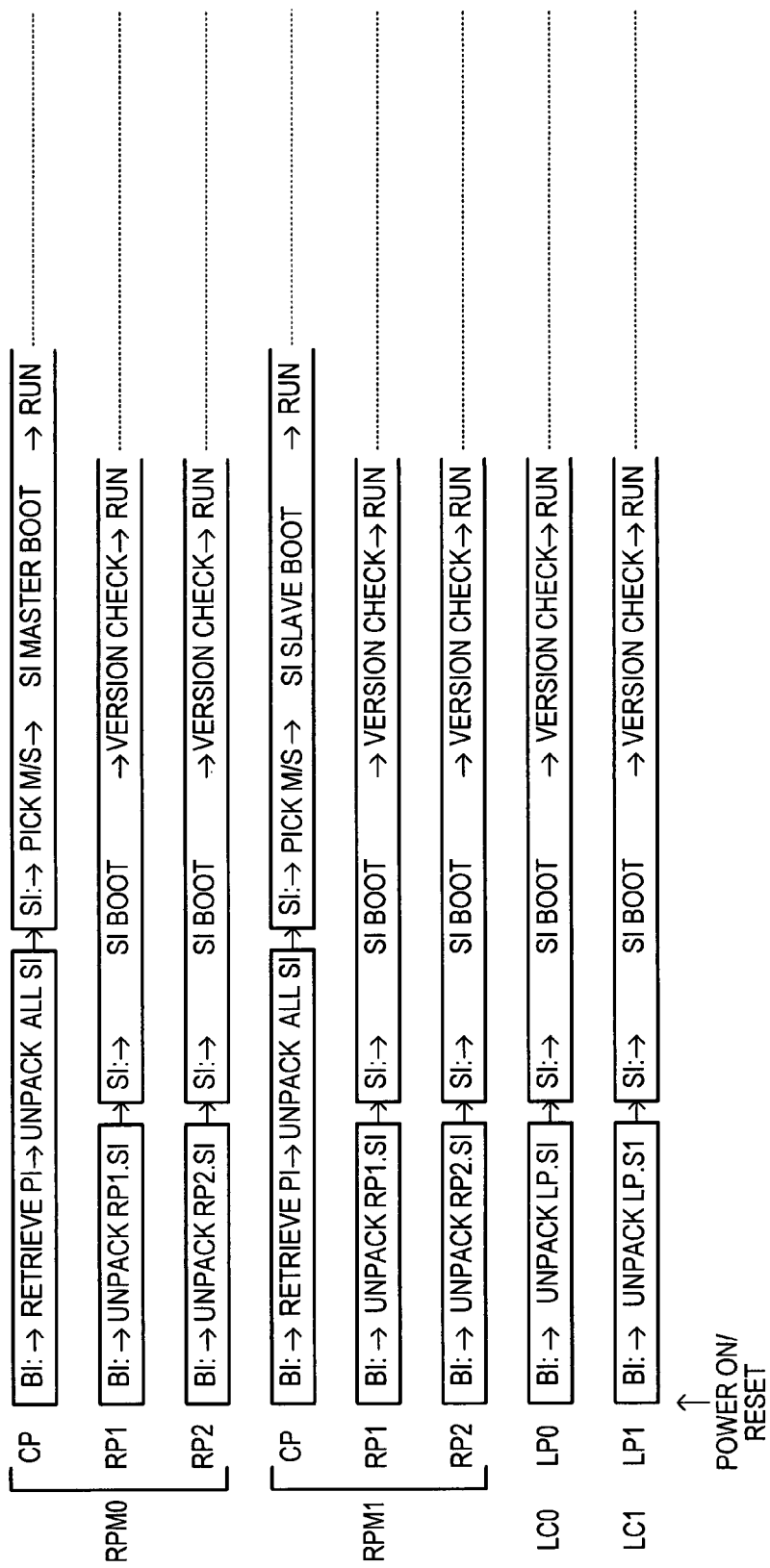
FIG. 12 shows a relative timeline for booting the multiple processors on a router/switch using FIG. 3 linecards and FIG. 4 RPMs according to an alternate embodiment.

The use of local cache boot on some processors can also be combined with a more traditional boot process on the master processors. FIG. 12 contains a relative boot timeline 1200 illustrating this embodiment. In timeline 1200, the RP and LP boot images unpack and boot into a local cached system image, e.g., as explained above with respect to FIGS. 3-10. Concurrently, the master processor boot images retrieve a packed image that contains all system images, unpack the system images to RAMdisk, and boot into their system images, as will be explained below with respect to FIG. 13. The master processor system images select a master and slave between the two control processors, and respond to version check requests from the RPs and LPs.

FIG. 13 contains a flowchart 1300 for the master boot image used by the CPs in FIG. 12. The CP stores, e.g., in local NVRAM memory, up to three boot profile identifiers, stored in an order of preference as PROFILE_0, PROFILE_1, and PROFILE_2. When the CP boot selected transfers execution to the CP boot image, the boot image retrieves the boot profile identifier PROFILE_0. The boot profile identifier is checked for a match to four defined boot profile identifiers FTP, TFTP, FLASH, and SLOT0. When a match is found, the boot image attempts to retrieve a packed system image from a corresponding source path.

When an image is loaded using the boot profile identifier, the image is decompressed into a series of system images and stored on RAMdisk. If the decompress is successful, execution is transferred to the CP system image that was stored to RAMdisk.

When no image was found corresponding to the current boot profile identifier, or decompress was unsuccessful, another profile identifier is retrieved from NVRAM. The profile identifiers are attempted in order, and the system wraps back to PROFILE_0 when PROFILE_2 fails. The boot image continues to try profiles until one is found that successfully boots.

Figure 14:
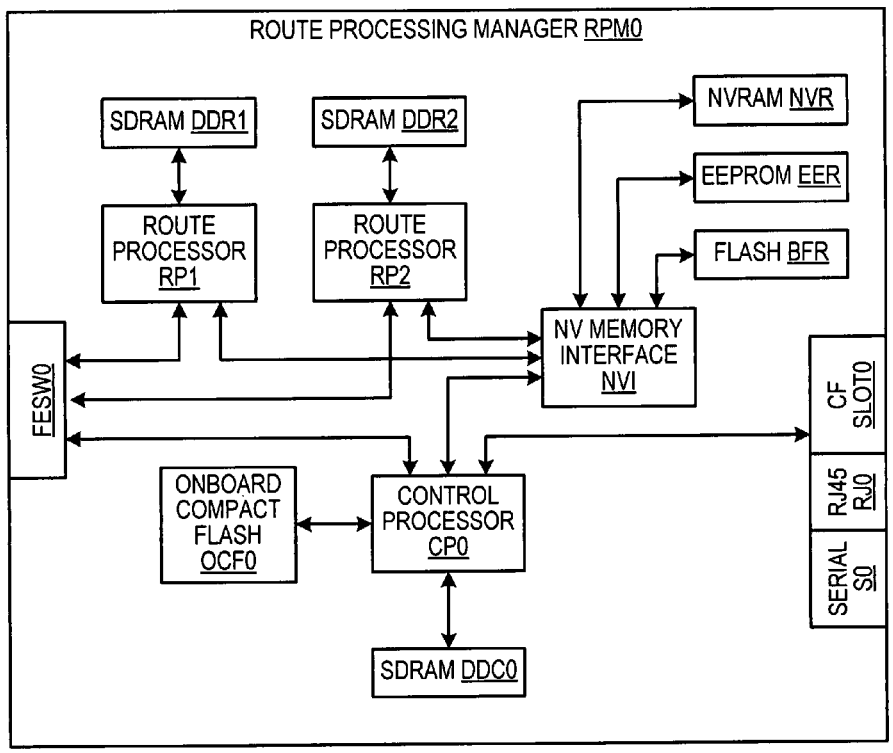
FIG. 14 contains a block diagram for an RPM according to an alternate embodiment.

The FIG. 4 RPM block diagram shows each processor (RP1, RP2, and CP0) communicating with exclusive non-volatile flash memory, NVRAM, and EEPROM. FIG. 14 shows an alternate embodiment for an RPM RPM0, with NVRAM, EEPROM, and FLASH shared between the three processors. As shown in FIG. 14, RPM0 includes one NVRAM NVR, one EEPROM EER, and one flash memory BFR. RPM0 also includes a non-volatile memory interface NVI, which is coupled between CP0, RP1, and RP2 on one side and NVR, EER, and BFR on the other side. The NV memory interface performs appropriate address translation for each processor such that each physically accesses different portions of the non-volatile memories without the processors having to manage memory allocation between themselves. The address translation function required is evident from the memory maps shown in FIG. 15.

Figure 15:
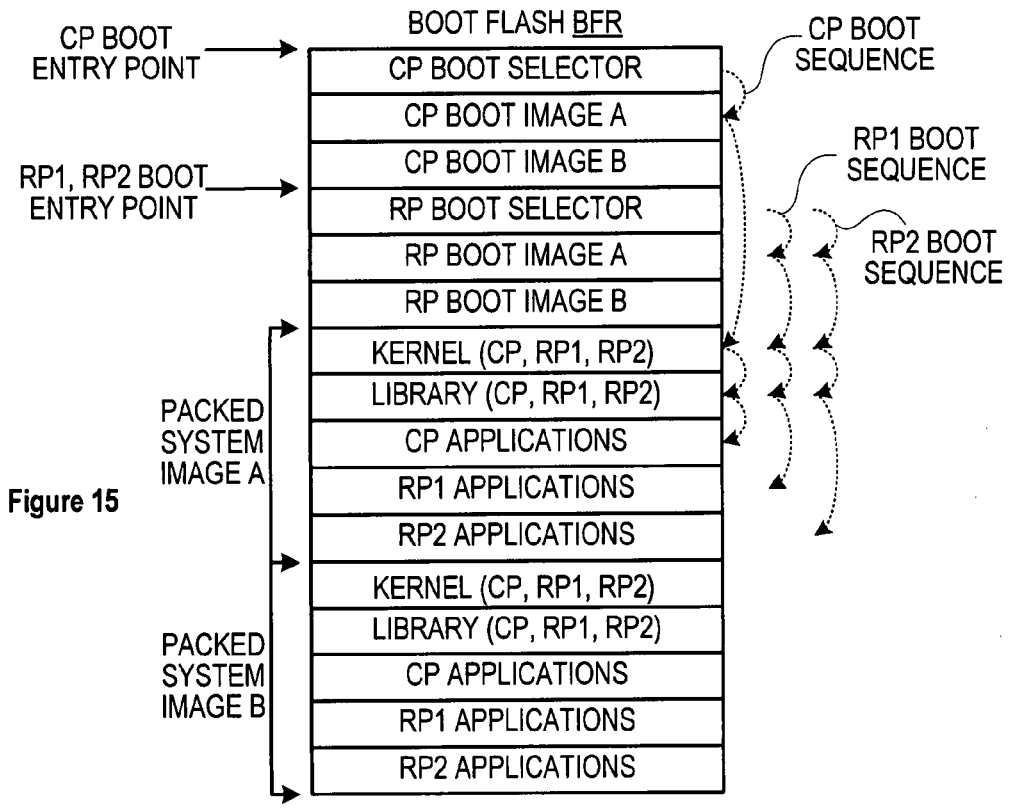
FIG. 15 shows the arrangement of boot components in nonvolatile memory local to the processors in the FIG. 14 RPM according to an embodiment.

FIG. 15 shows a memory map for boot flash memory BFR and at least a portion of EEPROM EER. Turning first to boot flash memory BFR, and starting with the lowest physical addresses, flash memory BFR stores a CP boot selector and up to two CP boot images (A and B). When the CP supplies an address that is lower than the RP1, RP2 boot entry point (e.g., the CP boot entry point, physical address 0), no translation is needed. The CP uses the boot selector and boot images, e.g., as described in the embodiments above.

Starting at the RP1, RP2 boot entry point, flash memory BFR stores an RP boot selector and up to two RP boot images (A and B). When either RP supplies a logical address between 0 and the RP1, RP2 boot entry point, interface NVI translates the address to a physical address by adding an offset to the RP1, RP2 boot entry point. The RPs use the same boot selector and boot images, but maintain separate sets of boot flags, as will be described below.

Two packed system images A and B are stored in boot flash BFR at addresses above the boot selectors and boot images. Interface NVI does not translate addresses in the packed system image region, as several of the components are shared among the processors.

In this embodiment, instead of a single packed system image file, each packed system image is stored in five compressed partitions in boot flash BFR. Considering the case where each processor boot image selects packed system image A, the executing boot image on each processor independently retrieves the kernel and library partitions from packed system image A and decompresses these into SDRAM memory for that processor. The executing boot image on each processor also retrieves and decompresses processor-specific applications from a partition designated for that processor. The boot image follows the same general logic flow as described in FIG. 9, while repeating the magic number and checksum checks for each partition. If one partition is found to be bad, it can be marked bad for the one processor, or optionally, for all processors. In one embodiment, any bad partition causes the entire packed system image to be marked bad, even if the defect only affects one processor's image.

FIG. 15 also illustrates an organization for EEPROM EER. Each processor stores its own sets of boot image flags and system image flags, corresponding to those described in FIG. 6. Interface NVI translates read and write requests from each processor to a physical address in a corresponding partition of EEPROM EER, with each processor only allowed to access its own partition.

In some embodiments, if cached boot is desired but no correct and fault-free version is determined to be stored locally, the process of retrieving and booting a centrally stored system image can include automatically storing a new packed system image, corresponding to the centrally stored version. Additional flag bits can be used to designate a local packed system image that is allowed to be auto-overwritten when faulty.

Although a few embodiments have been described in detail, those skilled in the art will recognize many other ways in which the concepts described herein can be rearranged, combined, or used in part to construct other embodiments. Embodiments with a fallback central system image boot path can operate effectively with only a single local cached system image, as even if a bad copy of that image is cached, the central system image path provides a fallback boot sequence. More than two system images can be cached as well and used, e.g., to selectively boot cards into multiple operational modes. Although a particular multiprocessor platform has been used in the examples, the principles described herein can be employed in other multiprocessor platforms as well. Non-volatile memory types other than those shown in the embodiments can be used as well, and the number and types of memory can be varied by the system designer.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of booting a system comprising multiple cooperating processors, the method comprising:
concurrently executing on each of a first plurality of the processors, not all sharing a common local memory system, a boot image for that processor stored in non-volatile memory local to that processor;
during execution of the boot image on each of the first plurality of the processors, selecting a system image for each processor stored in nonvolatile memory local to that processor;
on each of the first plurality of the processors, booting into the selected system image for each processor; and
on each of the first plurality of the processors, communicating with one of the multiple cooperating processors serving as a master boot processor for that processor to validate that the selected system image for that processor is the correct system image.

2. The method of claim 1, wherein the system images stored in nonvolatile memory local to the processors are stored in a compressed format, the method further comprising each processor in the first plurality decompressing the selected system image to an uncompressed format in memory local to that processor prior to booting into that system image.

3. The method of claim 2, further comprising each processor in the first plurality validating its selected compressed system image.

4. The method of claim 3, wherein validating comprises a processor checking a persistent system image valid flag stored in nonvolatile memory local to that processor.

5. The method of claim 4, wherein validating comprises a processor checking a signature stored with its selected system image, and marking the system image valid flag invalid if the signature check fails.

6. The method of claim 4, wherein validating comprises a processor performing a checksum operation for its selected system image, and marking the system image valid flag invalid if the checksum operation fails.

7. The method of claim 4, wherein validating comprises a processor checking the success of its system image decompression operation, and marking the system image valid flag invalid if the decompression operation fails.

8. The method of claim 3, further comprising, if validation fails on one of the first plurality of processors for a selected system image, selecting an alternate system image stored in nonvolatile memory local to that processor, setting a persistent system image selection flag stored in nonvolatile memory local to that processor to indicate the identity of the alternate system image, and attempting to reboot into the alternate system image.

9. The method of claim 8, wherein, if no local system image can be successfully booted by one of the first plurality of processors, the processor reverts to a boot mode that requests a system image from the master boot processor.

10. The method of claim 8, further comprising maintaining, for each of the first plurality of processors, a system image boot count in nonvolatile memory local to that processor, each such processor attempting to boot an alternate system image after the boot count reaches a retry threshold.

11. The method of claim 10, wherein a processor continues to increment the boot count with each boot retry after switching to the alternate system image, the processor reverting to a boot mode that requests a system image from the master boot processor after the boot count reaches an expedite threshold.

12. The method of claim 1, wherein when the check with the master boot processor indicates that an incorrect system image version was booted, the processor checks its local system images to determine if it has a valid correct version of the system image indicated by the master boot processor, the processor rebooting into that valid correct version if it exists among the local system images.

13. The method of claim 12, wherein if the processor determines that it does not have the valid correct version of the system image stored locally, it requests the system image from the master boot processor.

14. The method of claim 1, further comprising each processor storing persistent control data in a nonvolatile memory local to that processor, the persistent control data used to save state information for the boot process.

15. The method of claim 14, wherein the persistent control data is stored in a nonvolatile memory separate from the nonvolatile memory storing the system images.

16. The method of claim 14, wherein the persistent control data comprises state information on the boot path used in the current boot process.

17. The method of claim 16, wherein a processor allows update of a system image stored in nonvolatile memory local to that processor unless the stored system image corresponds to the system image currently executing on the processor.

18. The method of claim 1, wherein the first plurality of the processors comprises all of the multiple cooperating processors.

19. The method of claim 1, wherein at least two of the first plurality of processors share common local nonvolatile memory, each processor storing at least one system image in the shared local nonvolatile memory, the at least one system image selectable during execution of the boot image for that processor.

20. The method of claim 19, wherein the at least two of the processors share some components of their stored system images in the shared local nonvolatile memory.

21. The method of claim 19, further comprising a bus agent translating requests from the at least two of the first plurality of processors to point to areas of the shared local nonvolatile memory designated for each processor.

* * * * *